United States Patent [19]
Lin

[11] Patent Number: 5,903,331
[45] Date of Patent: May 11, 1999

[54] EYEGLASSES COMPRISING FRAME UNIT AND SNAP FITTED LENS UNIT

[75] Inventor: Jey-Ching Lin, Taipei, Taiwan

[73] Assignee: Mao Lin Enterprise Co., Ltd., Taipei, Taiwan

[21] Appl. No.: 08/988,354

[22] Filed: Dec. 10, 1997

[30] Foreign Application Priority Data

Oct. 8, 1997 [TW] Taiwan ................................ 86217069

[51] Int. Cl.$^6$ ..................................................... G02C 1/04
[52] U.S. Cl. ........................ 351/105; 351/106; 351/154; 351/130
[58] Field of Search ............................. 351/86, 103, 105, 351/106, 109, 124, 130, 133, 140, 143, 149, 154

[56] References Cited

U.S. PATENT DOCUMENTS

| 4,951,322 | 8/1990 | Lin | 351/44 |
| 5,576,775 | 11/1996 | Bolle | 351/106 |

Primary Examiner—Huy Mai
Attorney, Agent, or Firm—Fitzpatrick, Cella, Harper & Scinto

[57] ABSTRACT

A pair of eyeglasses includes a frame unit and a lens unit. The frame unit has a downwardly flaring projection protruding integrally and downwardly from a middle portion thereof, and two constricted slots which are located on two sides of the projection and which have inner end portions that are adjacent to the projection. The lens unit has two upwardly flaring upper portions which define a constricted hole therebetween and which are snap fitted respectively within the constricted slots of the frame unit so that the projection of the frame unit is snap fitted within the constricted hole of the lens unit, thereby retaining the lens unit on the frame unit. The engagement of the projection of the middle portion of the frame unit within the constricted hole in the lens unit facilitates firm connection of the lens unit and the frame unit.

6 Claims, 6 Drawing Sheets

EYEGLASSES COMPRISING FRAME UNIT AND SNAP FITTED LENS UNIT

BACKGROUND OF THE INVENTION

1. Field of the Invention

This invention relates to a pair of eyeglasses, and more particularly to a pair of eyeglasses including a frame unit and a lens unit which has an upper portion snap fitted within the frame unit.

2. Description of the Related Art

Referring to FIGS. 1, 2 and 3, a pair of conventional sunglasses 1 is shown to include a frame unit 2, a lens unit 3 and a generally inverted U-shaped nose bridge unit 4. The frame unit 2 has an elongated front frame 5 coupled to two temples 7 by bolts 6, and a lens-retaining slot 8 in which the upper portion of the lens unit 3 is confined. The nose bridge unit 4 consists of a nose support 10 and a nose pad 11 which is attached to the nose support 10. The nose support 10 has a slot 12 in which a middle portion 9 of the lens unit 3 is inserted tightly. The lens-retaining slot 8 of the frame unit 2 has two generally triangular end portions 13 in which two triangular projections 14 of the lens unit 3 are engaged within, thereby preventing the removal of the lens unit 3 from the frame unit 2. The conventional sunglasses 1 suffers from the following disadvantages:

(1) Upon mounting the lens unit 3 on the frame unit 2, because the triangular projections 14 are sharp and have a relatively large area, it is difficult and energy-consuming to insert the triangular projections 14 into the triangular end portions 13 of the lens-retaining slot 8. Furthermore, the tips 15 of the triangular projections 14 are easily broken during the mounting operation.

(2) The untimely removal of the middle portion 9 of the lens unit 3 from the frame unit 2 easily occurs due to the fact that it is remote (far) from the triangular end portions 13 of the slot 8 in the frame unit 2, thereby resulting in an unstable connection.

SUMMARY OF THE INVENTION

The object of this invention is to provide a pair of eyeglasses with a frame unit and a lens unit which are connected firmly to each other and which can be easily and conveniently assembled and removed from each other.

According to this invention, a pair of eyeglasses has a frame unit and a lens unit. The frame unit has a downwardly flaring projection protruding integrally and downwardly from a middle portion thereof, and two constricted slots which are located on two sides of the projection and which have inner end portions that are adjacent to the projection. The lens unit has two upwardly flaring upper portions which define a constricted hole or gap therebetween, and which are snap fitted respectively within the constricted slots of the frame unit so that the projection of the frame unit is snap fitted within the constricted hole of the lens unit, thereby retaining the lens unit on the frame unit. The engagement of the projection of the middle portion of the frame unit within the constricted hole in the lens unit facilitates firm connection of the lens unit and the frame unit.

BRIEF DESCRIPTION OF THE DRAWINGS

Other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
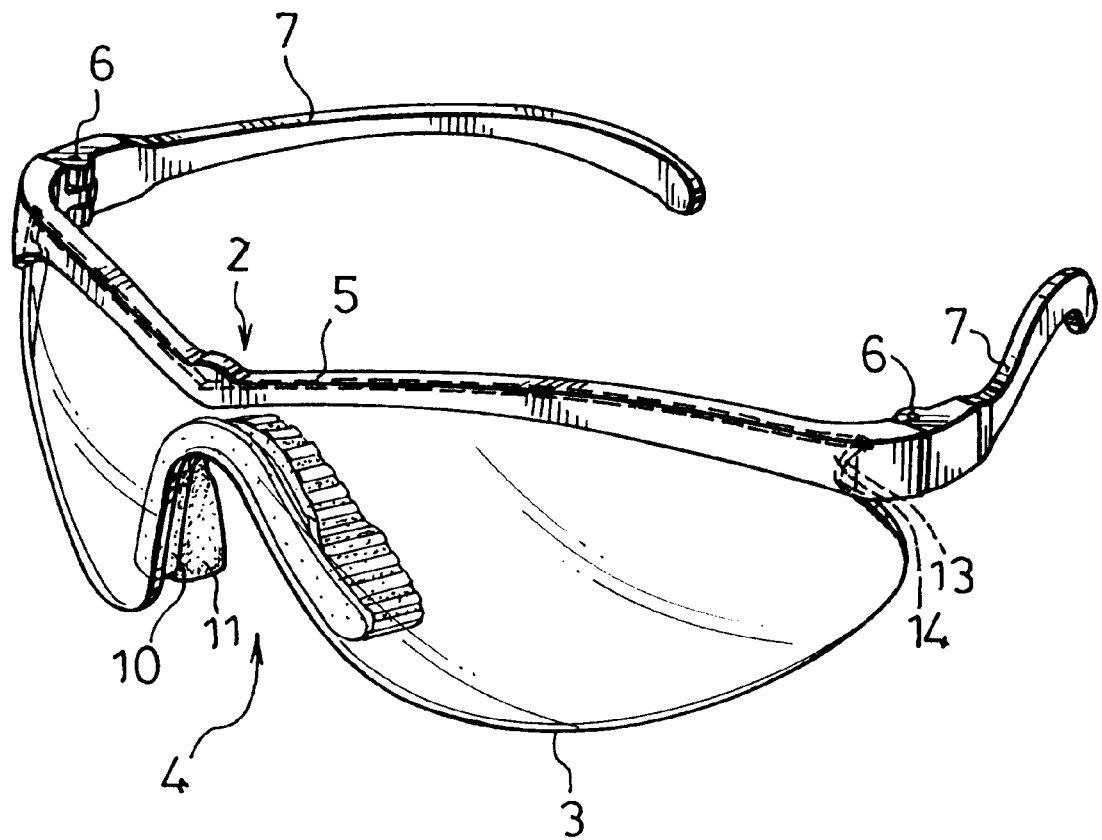
FIG. 1 is an assembled perspective view of a pair of conventional sunglasses provided with a frame unit and a lens unit which has an upper portion snap fitted within the frame unit.
Figure 2:
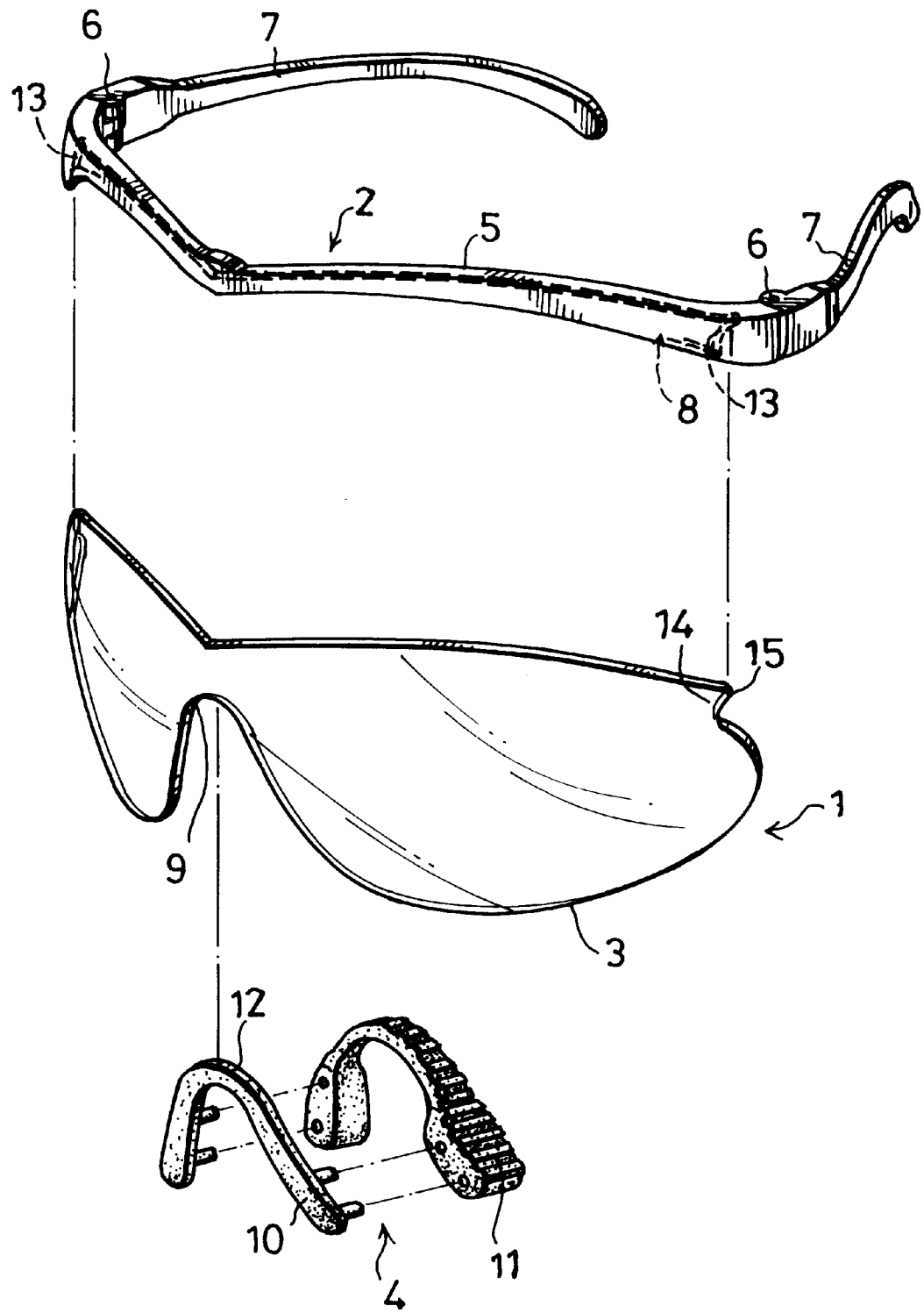
FIG. 2 is a partly exploded perspective view of the conventional sunglasses.
Figure 3:
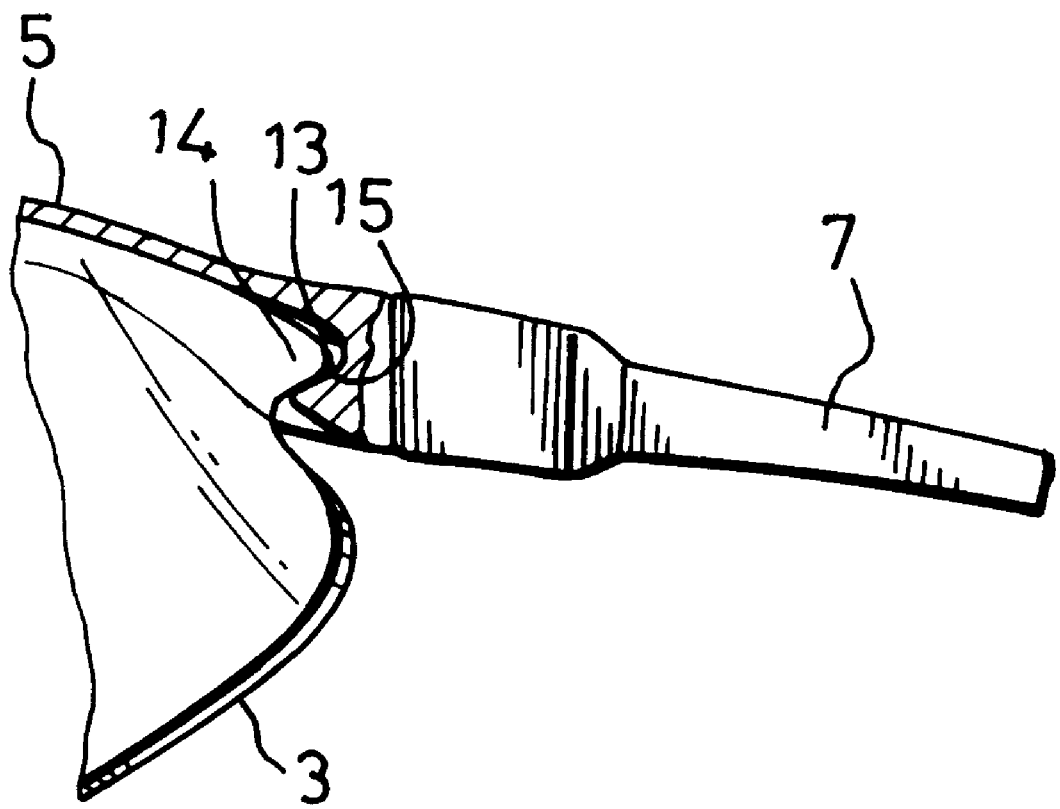
FIG. 3 is a schematic view illustrating how the lens unit is retained on the frame unit of the conventional sunglasses.
Figure 4:
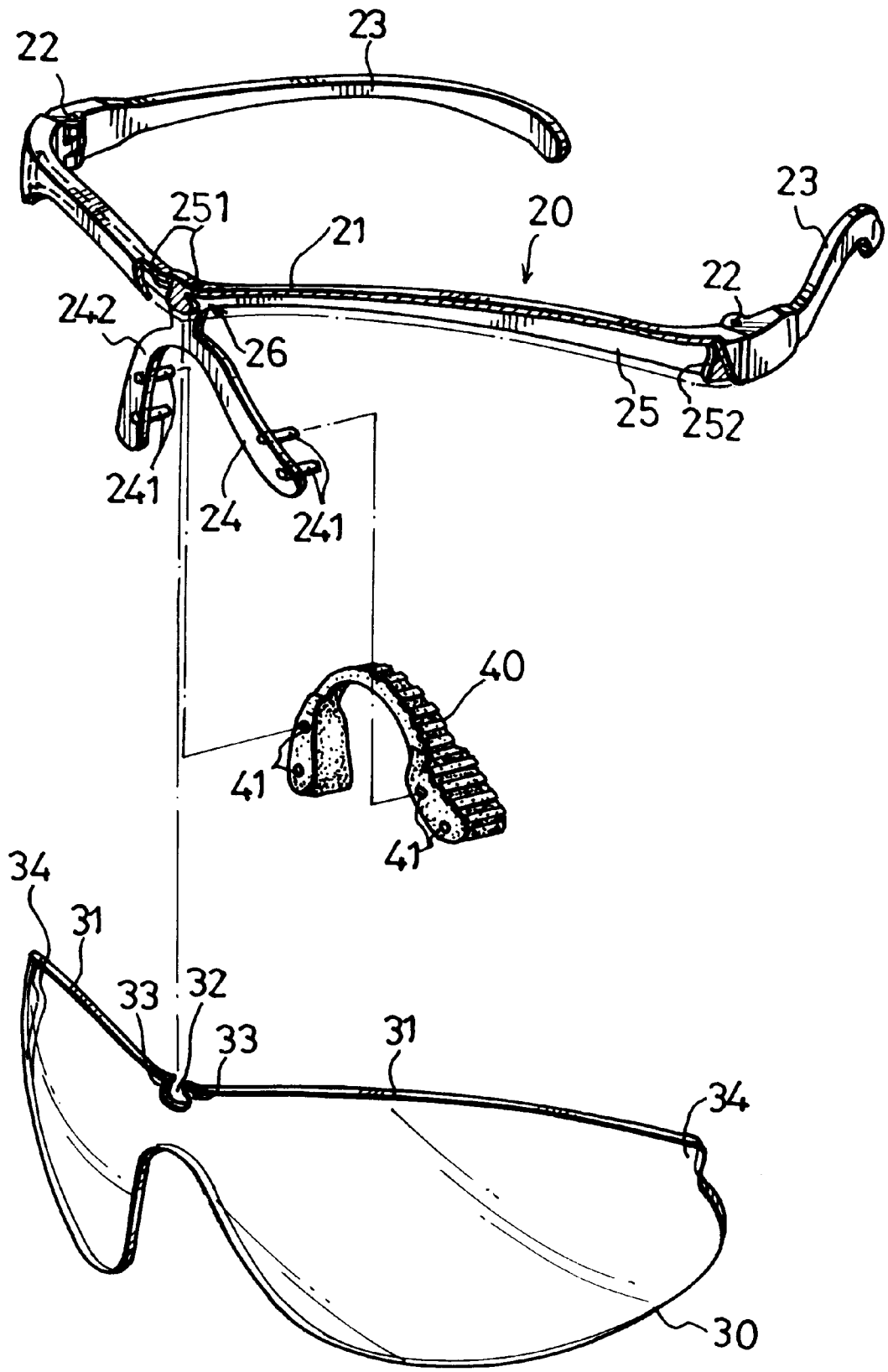
FIG. 4 is a partly exploded perspective view of a pair of eyeglasses according to this invention.
Figure 5:
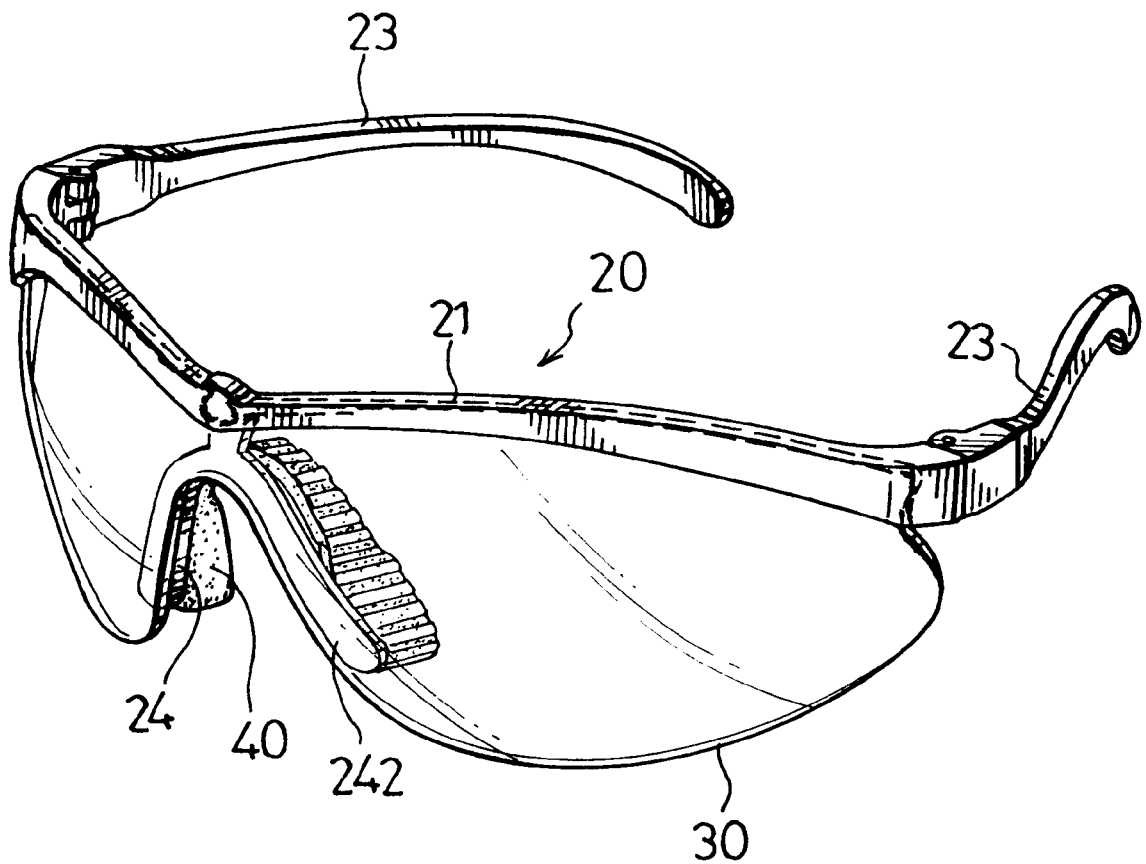
FIG. 5 is an assembled perspective view of the eyeglasses according to this invention.
Figure 6:
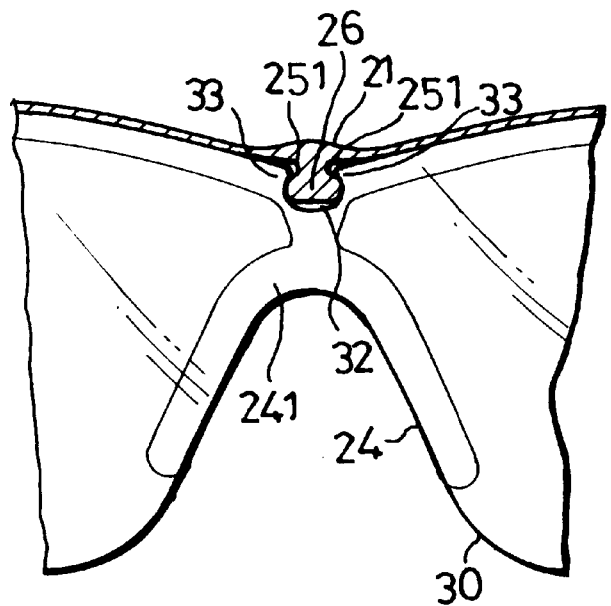
FIGS. 6 and 7 are schematic views illustrating the engagement between the lens unit and two constricted slots in the frame unit of this invention.
Figure 7:
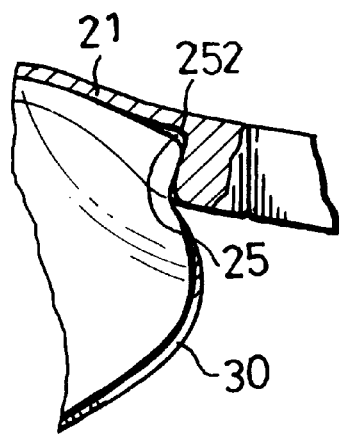

Referring to FIGS. 4, 5, 6 and 7, the preferred embodiment of a pair of eyeglasses according to this invention is shown to include a frame unit 20, a unitary lens unit 30 and a unitary nose pad 40.

The frame unit 20 has a front frame 21, two temples 23 connected respectively to two ends of the front frame 21 by means of bolts 22, and a generally inverted Y-shaped nose support 24. The front frame 21 has two constricted slots 25 which are formed along a bottom surface thereof, and a downwardly flaring projection 26 protruding integrally and downwardly from a middle portion of the front frame 21 and located between the constricted slots 25. The projection 26 has two opposite sides which define two generally triangular inner end portions 251 of the constricted slots 25. Each of the constricted slots 25 has a curved outer end portion 252. The nose support 24 has four integral pins 241 and a generally planar front face 242.

The lens unit 30 has two aligned upwardly flaring upper portions 31 which define a constricted hole 32 therebetween and which are snap fitted respectively within the constricted slots 25 of the frame unit 20. At this time, the projection 26 of the frame unit 20 is snap fitted within the constricted hole 32 of the lens unit 30, thereby retaining the lens unit 30 on the frame unit 20. As illustrated, the lens unit 30 has two generally triangular projections 33 engaged within the generally triangular inner end portions 251 of the constricted slot 25 of the frame unit 20, and two curved projections 34 engaged within the curved outer end portions 252 of the constricted slot 25 of the frame unit 20. A rear surface of the lens unit 30 abuts against the front face 242 of the nose support 24 of the frame unit 20 for positioning the lens unit 30 relative to the frame unit 20.

The nose pad 40 is generally inverted U-shaped and has a front surface formed with four pin holes 41 for insertion of the pins 241 of the nose support 24 in order to attach the nose pad 40 to the nose support 23.

Because the projections 34 are curved but not sharp, the upper portions 31 of the lens unit 30 can be easily inserted into the constricted slots 25 of the frame unit 20. In this way, breaking of the projections 34 can be avoided. Most importantly, the engagement of the projection 26 of the frame unit 20 within the constricted hole 32 of the lens unit 30 facilitates firm connection between the frame unit 20 and the lens unit 30. In other words, removal of the lens unit 30 from the frame unit 20 can be prevented.

With this invention thus explained, it is apparent that numerous modifications and variations can be made without departing from the spirit and scope of this invention. It is therefore intended that this invention be limited only as indicated in the appended claims.

I claim:

1. A pair of eyeglasses comprising:

a frame unit having a downwardly flaring projection protruding integrally and downwardly from a middle portion thereof, and two constricted slots located on respective sides of said projection, each of said constricted slots having an inner end portion adjacent to said projection; and a lens unit having two upwardly flaring upper portions that define a constricted hole therebetween, said upwardly flaring upper portions being respectively snap fitted within said constricted slots of said frame unit so that said projection of said frame unit is snap fitted within said constricted hole of said lens unit, thereby retaining said lens unit on said frame unit.

2. A pair of eyeglasses as claimed in claim 1, wherein said downwardly flaring projection of said frame unit comprises a generally inverted Y-shaped nose support integrally formed therewith, said nose support having a generally planar front face, said pair of eyeglasses further having a nose pad attachable to said nose support, said lens unit having a rear surface that abuts against said front surface of said nose support and positions said lens unit relative to said frame unit.

3. A pair of eyeglasses as claimed in claim 1, wherein said downwardly flaring projection of said frame unit comprises a generally inverted Y-shaped nose support integrally formed therewith.

4. A pair of eyeglasses as claimed in claim 3, wherein said downwardly flaring projection of said frame unit has a generally planar front face.

5. A pair of eyeglasses as claimed in claim 4, said lens unit further having a rear surface that abuts against said front surface of said nose support and positions said lens unit relative to said frame unit.

6. A pair of eyeglasses as claimed in claim 3, further comprising a nose pad attachable to said nose support.

* * * * *